March 21, 1967  D. T. TOSTI  3,309,792

TEACHING APPARATUS

Filed Jan. 9, 1964

| | | | 3 |
|---|---|---|---|
| 1. | During the play of the hand, cards are played one at a time in clockwise rotation. When N plays a card, who plays the next card? | 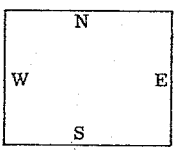 E | W /// |

| | | | | 5 |
|---|---|---|---|---|
| 2. | A *trick* is composed of four cards. Which shows a trick? /// | 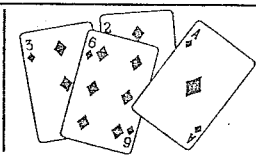 | 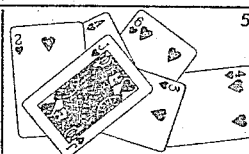 | |

| | | | 4 |
|---|---|---|---|
| 3. | Usually the highest card takes the trick. Who takes the trick here? (N/E/S/W) | 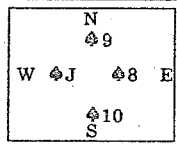 | /// |

| | | | | 1 |
|---|---|---|---|---|
| 4. | 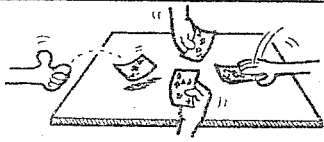 | How many cards does each player play to a trick? /// | | |

| | | | 2 |
|---|---|---|---|
| 5. | If all cards played to a trick are from the same suit, the highest card takes the trick. Who takes the trick here? | 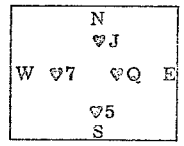 | /// |

| | 7 |
|---|---|
| 6. A trick consists of: a. 1 card.  b. 4 cards.  c. 13 cards.  d. (none of these) /// | |

| | | | 6 |
|---|---|---|---|
| 7. | The card which takes the trick is the most valuable card. Assuming Spades are led, which card takes this trick? | ♠A | /// ♠K |

| 1 | 2 | 3 | 4 | 5 | 6 | 7 |
|---|---|---|---|---|---|---|
| one | E (♥Q) | A | W (Note: He took it with ♠J.) | A | A | b. 4 cards. |

/10/  /12/

United States Patent Office 3,309,792
Patented Mar. 21, 1967

3,309,792
TEACHING APPARATUS
Donald T. Tosti, Albuquerque, N. Mex., assignor to Teaching Machines, Inc., Albuquerque, N. Mex., a corporation of Delaware
Filed Jan. 9, 1964, Ser. No. 336,766
9 Claims. (Cl. 35—8)

This invention relates to displays for programmed learning. More particularly it relates to an improved combination of essential components of programmed learning courses, namely a novel arrangement of stimuli and confirmations.

Prior to this invention, all known developments in the field of programmed learning employed the use of either a mechanical device or a scrambled text means for precluding inadvertent peeking at the answers or confirmations to the questions or simuli.

The mechanical devices are essentially of two forms: (1) those that are machines having metal or plastic housings and automatically actuated parts and (2) those that involve the use of a sliding mask of paper, cardboard or inexpensive plastic to hide the confirmations.

The machines generally are considered "cheat proof" and are, therefore, indicated for use by young children. The devices employing the sliding mask are essentially not "cheat proof," as they are intended for use by mature adults with the sliding mask merely used as an aid in preventing inadvertent peeking. The sliding mask devices are no more than a plurality of questions or question frames on a piece of paper or the like bearing alternate answers or indicia to evoke a written response from the student. In the sliding mask devices, which obviously are less expensive than the machine devices, confirmations are found opposite respective stimuli and are hidden by the mask which is slid to uncover each confirmation after its corresponding question has been answered.

To preclude cheating, even by mature adults, simple non-mechanical devices are employed with a scrambled text in which the material is arranged in book form with the confirmation to each stimulus on a different page from that on which the stimulus appears. There are different arrangements of scrambled text preparations, but all require students to turn pages to find each confirmation, while marking or holding a finger where the corresponding stimulus is presented.

It will be borne in mind that in a programmed text, the student learns from factual material presented with certain of the questions and from the correct answers to prior questions. The questions and the factual material are graded, and each question is accompanied either by a plurality of alternate answers from among which the student selects or by a signal which requires him to construct an answer. Accordingly, when the student selects or constructs the correct answer through his own intelligence processes, he may be considered to have learned.

In order for the student best to progress, it is necessary that he be able to confirm his response. However, it is not intended that the student learn the answer prior to construction, selection or response by his independent judgment. Accordingly, in programmed learning it becomes important that the student should not peek at a correct answer if the same is available.

The instant invention relates to programmed learning devices which are non-mechanical in nature and which provide a unique manner of confirmation by reason of which costs are saved and learning efficiency is increased.

In accordance with the instant invention, and as an object thereof, there is provided a device in which the stimuli are presented in sequential fashion with accompanying multiple-choice answers or signals for constructed responses.

It is a further object of the invention to provide indicia of a distinctive form to designate where, on the same page on which a stimulus is presented, its confirmation may be found.

It is another object of the invention that the indicia or code designating the confirmations be arranged randomly.

A yet further object of the invention is that the confirmation to each question be placed on the same face as the question or stimulus, and that each confirmation be designated by a code matching in configuration, size or shape the indicia or code of the stimulus to which the confirmation corresponds.

One measure of the efficiency of the student in learning is the rapidity with which the text is completed. Accordingly, verification of the correctness of each answer selected or constructed should be done at the highest possible speed. Obviously, the scrambled text techniques slow down the student in verification of answers by the requirement to move back and forth from one page to another. The sliding mask technique, while it does not slow down the student appreciably, permits peeking at the correct answer because the correct answer appears in immediate proximity to the stimulus, only hidden by a cover which can manually be slid easily out of the way.

In experiments conducted with students, they spent less time in learning selected programmed text material when using the instant invention as compared to learning with a mechanical device or by means of the same programmed material presented with a scrambled text type device. Approximately five percent less time was spent by students using the instant invention as compared with the programmed text material of the scrambled text type; and approximately fifteen percent less time was spent when compared to a mechanical device. Mean gain by students, in percentage points in pre- and post-testing following the three learning programs, showed that the gain using the subject matter of the present invention was 48.6%; using the mechanical device was 45.2%; and using the programmed text material of the scrambled text type was 41.8%.

On the drawing:

FIG. 1 is a duplication or copy of an actual page used in a bridge course taught in accordance with the coded program presentation constructed in accordance with one embodiment of the invention.

Referring now more particularly to the drawing, the coded program comprises one or more pages 101. The pages may be fabricated from any suitable material, such as paper or the like, which may be connected or bound together in the form of a book for presentation of an entire program.

Each page is provided with a plurality of indicia. The indicia are arranged in frames 111 or groups to provide what is referred to in the art as stimuli. The stimuli are placed in frames 11 which are sequentially designated by, for example, numerals 1–7, inclusive, indicating the sequence in which the frames are to be considered by the student. Each stimulus may comprise a statement of fact, and always comprises a question. For example, frame 1 has a stimulus comprising a statement of fact and a question, whereas frame 6 comprises only a question.

One suitable method for arranging the frames sequentially is to extend them horizontally and dispose them for consideration in a vertical fashion. Such is the nature of the disposition in the drawing. However, it is not intended that the frames 111 necessarily be arranged vertically for sequential consideration, as other suitable arrangements for facility of student consideration will be obvious.

The stimulus in some frames 1, 2, 3, 6 and 7 are accompanied by indicia representing alternative answers to the question portion of the corresponding stimulus from which the student must select. In other frames, such as frames 4 and 5, the stimulus is accompanied by a question which requires the student to construct a response.

To direct the student to the confirmation of his selection of an answer in each frame 111, there is provided in each frame a code or designation. In the embodiment of the invention illustrated, I have designated the coded markings by numerals 1–7, with such numerals distinguishable from the indicia which designate the respective frames by variation in positioning and in type style, for example. Notice that the indicia representing the respective frames 111 are positioned preferably uniformly in vertical alignment along the left-hand edge of the page, whereas the indicia coded to the confirmations appear at the opposite sides of the frames 111. It should be observed, however, that the code markings referring to the confirmations are randomly arranged and are in no particular sequence. However, it is preferable to dispose the code markings in some reasonable alignment, such as along the right-hand side of the page, as shown in the drawing.

The code markings or indicia in the frames 111 may be of any configuration, shape or size. However, if selected from a group in which a sequence might be implicit, such code markings or indicia must be randomly applied in the frames 111. It is necessary, however, that the code markings in the frames 111 be of the same shape, configuration or size and substantially the same as the code markings for the confirmations, as will hereinafter become apparent.

On a portion 121 of the same page on which the various stimuli are found, confirmations appear. Each confirmation bears a code marking. Preferably, the confirmations are contiguous with each other. The confirmations in the embodiment which is shown are arranged in accordance with the numerical sequence of the code employed and range from left to right. However, the confirmations may be randomly arranged, and it is not intended that they necessarily be positioned at the bottom of the page, as other suitable arrangements may be found.

Other arrangements which will be readily apparent provide for sequentially coding the stimuli frames and randomly arranging the confirmations, so that three combinations of arrangements are possible. That is, random arrangement of the code in the stimuli portion of the page with sequential arrangement of the confirmation frames in accordance with their code sequence; sequentially arranging the code in the various frames with random arrangement of the coded confirmations; and random arrangement of the coded frames together with arrangement of the coded confirmations.

The code markings of the confirmations are preferably disposed adjacent their respective confirmations for easy identification thereof by the student. Additionally, matchability of confirmation codes with frame codes is dependent upon the size, configuration, color or shape of the indicia. It is apparent, of course, that to be of value for the purpose intended, the code markings in the frames be matchable with their corresponding code markings of the confirmations; and therefore, each confirmation code must be the same size, shape, color or configuration as its corresponding frame code.

Now, the device operates as follows: Have reference to the numeral 1 which appears to the left of the uppermost frame 111 in the drawing which states a fact and then asks a question to which there are provided alternate answers appearing in the first horizontal frame 111. Only one of the alternate answers is correct, namely the first answer. The student may readily verify his answer after making the same by noting the code marking numeral 3 which appears to the right. The student will match that code marking with the confirmation which is coded with the same indicia, namely confirmation frame 3 in the confirmation section 121. After the student has completed the first question, he will then go to the second frame 111, which is labeled with a numeral "2" at the left, and which contains a fact and a second question. It should be borne in mind that the questions are graded in difficulty and that they are to be considered in the order of the numbering of the frames 1–7. It should also be borne in mind that, notwithstanding the tendency to peek, the random code markings on the stimuli frames act as a sufficient deterrent for the mature student to preclude inadvertent peeking. As previously hereinbefore indicated, this is demonstrated by pre- and post-testing gains demonstrated by mature students using the instant invention as compared with students learning the same program, however with a different confirmation method.

The presentation of the stimulus and confirmation on the same page in the manner herein described minimizes the need for employing a mechanical device and overcomes the limitations relating to the page flipping required in connection with a scrambled text. As indicated previously, statistically the device herein described demonstrates an advancement in programmed teaching technique with the results in part explained by the fact that, on a sheet of standard size, more questions can be included than any of the older methods. Thus, less time is spent in turning and changing pages, and more time is spent in learning the material.

As many changes or substitutions could be made in the described teaching apparatus, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:
1. A teaching apparatus comprising a leaf, said leaf bearing indicia representing a plurality of stimuli including questions adapted to evoke student responses and arranged in frames, markings of predetermined shape sequentially arranged designating the order of consideration of the stimuli, a code designation adjoining each stimulus and arranged at random, each code designation of a shape different from the others, a confirmation for each stimulus, a mark of matchable configuration with each code designation disposed adjacent corresponding confirmations, whereupon matching of said code designations and said marks, the correct answers to the questions are observed.

2. A teaching apparatus substantially as defined in claim 1, having a horizontally extending frame in which each stimulus is disposed, said frames disposed in a vertically extending sequence.

3. A teaching apparatus substantially as defined in claim 2 in which the correct answers are confirmed on one area of said leaf and disposed in sequence corresponding to the sequential order of said code designations.

4. A teaching apparatus comprising a leaf, said leaf bearing indicia representing a plurality of stimuli including questions adapted to evoke student responses, a horizontally extending frame in which each stimulus is disposed, said frames disposed vertically, markings vertically aligned and sequentially arranged in said frames respectively, and designating the order of consideration of the questions, code designations of different shapes and of random selection vertically aligned in said frames, confirmations to said questions disposed in one area of said leaf, code marks matchable in shape with said code designations and adjacent said confirmations respectively, whereupon matching of each code mark with a corresponding code designation the confirmation for the corresponding question is observed.

5. A teaching apparatus substantially as defined in claim 4 in which said confirmations are randomly arranged.

6. A teaching apparatus substantially as defined in claim 4 in which said confirmations are arranged in orderly manner.

7. A teaching apparatus comprising a leaf, said leaf bearing indicia representing a plurality of questions adapted to evoke student responses, a horizontally extending frame in which each question is disposed, said frames disposed vertically, markings vertically aligned and sequentially arranged in said frames respectively, and designating the order of consideration of the questions, code designations vertically aligned in said frames, confirmations to said questions disposed in one area of said leaf and code marks of the same shape and size and matchable with said code designations adjacent said confirmations respectively, whereupon matching of each code mark with a corresponding code designation, the correct answers for the corresponding questions are observed.

8. A teaching apparatus substantially as defined in claim 7 in which said confirmations are randomly arranged.

9. A teaching apparatus substantially as defined in claim 7 in which said confirmations are arranged in orderly manner.

References Cited by the Examiner

UNITED STATES PATENTS

| | | |
|---|---|---|
| 1,625,218 | 4/1927 | Lundy. |
| 2,422,491 | 6/1947 | Lorber _____ 35—48.1 |
| 3,123,920 | 10/1959 | Crowder et al. _____ 35—9 |

OTHER REFERENCES

Teaching Machine and Programmed Learning, by Lumsdaine and Glaser published by National Education Association, October 1960, pages 289–293.

EUGENE R. CAPOZIO, *Primary Examiner.*

S. M. BENDER, R. W. WEIG, *Assistant Examiners.*